United States Patent
Monichino

(10) Patent No.: US 9,759,620 B2
(45) Date of Patent: Sep. 12, 2017

(54) PRESSURE SENSOR

(71) Applicant: Metallux SA, Mendrisio (CH)

(72) Inventor: Massimo Monichino, Mendrisio (CH)

(73) Assignee: Metallux SA (CH)

( * ) Notice: Subject to any disclaimer, the term of this patent is extended or adjusted under 35 U.S.C. 154(b) by 155 days.

(21) Appl. No.: 14/654,704

(22) PCT Filed: Dec. 20, 2013

(86) PCT No.: PCT/IB2013/061208
§ 371 (c)(1),
(2) Date: Jun. 22, 2015

(87) PCT Pub. No.: WO2014/097255
PCT Pub. Date: Jun. 26, 2014

(65) Prior Publication Data
US 2015/0323404 A1    Nov. 12, 2015

(30) Foreign Application Priority Data
Dec. 21, 2012    (IT) .............................. TO2012A1130

(51) Int. Cl.
*G01L 9/00* (2006.01)
*G01K 13/02* (2006.01)
*G01L 19/14* (2006.01)

(52) U.S. Cl.
CPC ............ *G01L 9/0051* (2013.01); *G01K 13/02* (2013.01); *G01L 9/0052* (2013.01); *G01L 19/148* (2013.01)

(58) Field of Classification Search
CPC .... G01L 9/0051; G01L 9/0052; G01L 19/148
See application file for complete search history.

(56) References Cited

U.S. PATENT DOCUMENTS

| | | |
|---|---|---|
| 4,612,227 A | 9/1986 | Lam et al. |
| 4,658,651 A | 4/1987 | Le |
| 4,916,426 A | 4/1990 | Yajima et al. |
| 5,285,690 A | 2/1994 | Koen et al. |
| 5,443,550 A | 8/1995 | Yoneda et al. |

(Continued)

OTHER PUBLICATIONS

International Search Report for International Application No. PCT/IB2013/061208, dated Dec. 10, 2014.

*Primary Examiner* — Ryan Walsh
(74) *Attorney, Agent, or Firm* — Heslin Rothenberg Farley & Mesiti P.C.; Victor A. Cardona, Esq.

(57) ABSTRACT

A pressure sensor has a circuit arrangement supported by a sensor body and includes: a first electrical-circuit pattern, having respective tracks made of electrically conductive material deposited on a first face of an electrically insulating material, a second electrical-circuit pattern having respective tracks made of electrically conductive material deposited on a region of the second face of the material, and connection means, which electrically connect the first electrical-circuit pattern to the second electrical-circuit pattern. Tracks of the second electrical-circuit pattern have at least one first track defining a plurality of first pads and one second track defining a plurality of second pads, for connection of a first terminal and of a second terminal of the second circuit component, respectively. The first and second track are prearranged so that the first terminal and the second terminal can be connected to any one of the first pads and the second pads.

20 Claims, 10 Drawing Sheets

(56) References Cited

U.S. PATENT DOCUMENTS

| | | | | |
|---|---|---|---|---|
| 6,003,380 A | * | 12/1999 | Sasaki | G01L 9/0055 |
| | | | | 73/720 |
| 2009/0314096 A1 | * | 12/2009 | Colombo | G01L 19/0084 |
| | | | | 73/754 |
| 2012/0104518 A1 | * | 5/2012 | Salmaso | G01L 9/0042 |
| | | | | 257/415 |

* cited by examiner

PRESSURE SENSOR

CROSS REFERENCE TO RELATED APPLICATIONS

This application is a national stage filing under section 371 of International Application No. PCT/IB2013/061208, filed on Dec. 20, 2013, and published in English on Jun. 26, 2014, as WO 2014/097255 A2, and claims priority of Italian application No. TO2012A001130 filed on Dec. 21, 2012, the entire disclosure of these applications being hereby incorporated herein by reference.

FIELD OF THE INVENTION

The present invention relates to pressure sensors and has been developed with particular reference to sensors having a sensor body made of electrically insulating material, such as a ceramic or polymeric material, provided with a cavity and a membrane at the cavity.

STATE OF THE ART

Sensors of the type referred to are used in devices for detection of the pressure of fluids (liquids and aeriforms) in various sectors, such as the automotive sector, the domestic sector and the sector of electrical household appliances, the air-conditioning sector and the hydro-thermal-sanitary sector. These detection devices typically comprise a casing or a support, defining at least one housing with an inlet for fluid, the pressure of which is to be measured, as well as a pressure sensor set in the housing in such a way that a diaphragm portion thereof is exposed to the fluid.

The sensor has a sensor body, made of electrically insulating material, with an axial cavity that is closed at at least one end by the aforesaid diaphragm portion. In some types of sensor (referred to as "relative sensors"), the axial cavity is substantially a blind cavity, which is closed on one face of the sensor body, here referred to for simplicity as "upper face"; the axial cavity opens, instead, on the opposite face of the sensor body, here referred to as "bottom face", and is set in fluid communication with the inlet of the device. In other types of sensor (referred to as "absolute sensor"), the cavity is instead substantially closed at both ends, at one of these there being provided the diaphragm portion, the outer side of which is exposed to the fluid. Irrespective of the type of sensor (whether relative or absolute), the sensor body may be monolithic, or else made of a number of parts. For example, in the case of a sensor of a relative type, the sensor body may be monolithic in order to define integrally the blind cavity with the corresponding diaphragm portion, or else comprise an axially hollow body, fixed at one end of which is a diaphragm element in order to close the aforesaid cavity at one side. The body of a sensor of an absolute type is generally made of a number of parts, for example including a main body that integrally defines a blind cavity, closed at one end by a portion of the body itself and closed at the other end by a diaphragm portion applied to the main body. There are on the other hand also known pressure sensors of an absolute type prevalently consisting of a monolithic body.

With reference, for example, to a relative sensor, the sensor body supports a circuit arrangement, which includes a circuit pattern made of electrically conductive material deposited on the upper face. This arrangement includes various circuit components, amongst which piezoelectric, piezoresistive or resistive means, designed to detect any bending or deformation of the membrane portion that represents the pressure of the fluid.

Certain detection devices comprise, in addition to a pressure sensor, also a sensor for detection of the temperature of the fluid. The measurements of temperature can be used by the control electronics for compensating the measurements of pressure and/or for purpose of protection of the device and/or for providing information of temperature to other subsystems of the apparatus on which the detection device is installed.

The temperature sensor can be mounted in the device in a position isolated from the fluid, for example on the upper face of the body of the pressure sensor, at or in the proximity of diaphragm portion thereof; in this way, detection of temperature of the fluid is indirect, i.e., estimated on the basis of the temperature assumed by the sensor body. This type of detection is liable to possible detection errors or delays due, for example, to the thermal inertia of the sensor body.

In other cases, the detection device is configured in such a way that the temperature sensor, or at least its temperature-sensitive part, is exposed directly to the fluid in order to make a direct detection of the quantity of interest. This type of solution is generally complicated and costly, as well as being for from flexible in relation to the possibility of installing different configurations of temperature sensors.

OBJECT AND SUMMARY OF THE INVENTION

The present invention has basically the aim to provide a pressure sensor having a simple, inexpensive and particularly flexible structure in relation to the possibility of installing different configurations of sensors or generic circuit components that are to be exposed to the fluid.

According to another aspect, the object of the invention is to provide a pressure sensor having a simple, inexpensive, and particularly reliable structure in relation to its characteristics of fluid-tight mounting on generic devices and apparatuses.

One or more of the above objects are achieved according to the invention by a pressure sensor and by a device integrating a pressure sensor having the characteristics specified in the annexed claims, which form an integral part of the technical teaching provided in relation to the invention.

According to a preferential version of the invention, a pressure sensor is provided, comprising a sensor body made at least in part of electrically insulating material, having a first face and a second face opposite to one another and a cavity, the cavity being closed at at least one axial end thereof by a diaphragm portion, the pressure sensor further comprising a circuit arrangement supported by the sensor body and including:
  a first electrical-circuit pattern, comprising a plurality of respective tracks made of electrically conductive material deposited on the first face, on its side external to the cavity, there being connected to the first circuit pattern a plurality of first circuit components, amongst which detection means for detecting bending or deformation of the membrane portion;
  a second electrical-circuit pattern, comprising a plurality of respective tracks made of electrically conductive material deposited on a region of the second face; and
  connection means, which electrically connect the first circuit pattern to the second circuit pattern and extend in an axial direction of the sensor body.

According to an innovative aspect of the invention, connected to the second circuit pattern is at least one second circuit component, having an active part that is to be exposed to the fluid and at least one first connection terminal and one second connection terminal, and the tracks of the second circuit pattern comprise at least one first track, defining a plurality of first, pads, and one second track, defining a plurality of second pads, for connection of the first terminal and of the second terminal of the second circuit component, respectively. The first and second tracks are prearranged so that the first terminal and the second terminal of the second pads, respectively, and/or to the first pad and to the second pad, respectively, of any one of a plurality of pairs of first pads and second pads.

Thanks to the above characteristics, the flexibility of production of the pressure sensor is considerably increased, in relation to the possibility of installing different configurations of sensors or generic circuit components that are to be exposed to the fluid.

According to a further aspect, in itself autonomously inventive, the tracks of the second circuit pattern comprise at least one first electrical track and one second electrical track, for a further circuit part, for example a detection part or a part for execution of an electrical function, such as a second circuit component.

The tracks of the second circuit pattern comprise a track, respectively a plurality of tracks, set so as to define a substantially annular profile, in particular a profile that is substantially concentric or coaxial to the cavity of the sensor body. Deposited on the second face of the sensor body is a protective layer that coats the aforesaid track, or plurality of tracks, respectively, and on which an annular sealing elements rests, with the latter that preferably circumscribes a region, positioned or extending in which is the aforesaid further circuit part or second circuit component.

The protective layer preferentially includes at least a respective part—defined for practical reasons of description as "in relief" but not limited to this definition—that is generally annular, with a surface substantially plane or in any case designed to provide a uniform rest for the aforesaid sealing element.

Thanks to the above characteristics, the track or tracks that forms/form as a whole a substantially annular shape constitute a sort of substrate for the protective layer deposited thereon, this layer for example assuming at least in part a position "in relief" with respect to the same protective layer deposited in another area without tracks, aimed at providing a homogeneous resting and/or sealing surface.

In other words, the protective layer—in addition to performing its own primary function of preserving the integrity of the tracks of the second circuit pattern—also provides a substantially annular base for the sealing element. The reliability of the sensor, and in particular in relation to its sealing characteristics, can in this way be increased in a simple and economically advantageous way even using techniques of deposition of materials usual in the sector, such as serigraphic deposition.

BRIEF DESCRIPTION OF THE DRAWINGS

Further purposes, characteristics, and advantages of the present invention will emerge clearly from the ensuing detailed description and from the annexed drawings, which are provided purely by way of explanatory and non-limiting example and in which.

DESCRIPTION OF PREFERRED EMBODIMENTS OF THE INVENTION

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" and like that may be present in various points of the present description do not necessarily all refer to one and the same embodiment. Furthermore, the particular configurations, structures, or characteristics may be combined in any adequate way in one or more embodiments. The references used in what follows are merely provided for convenience and do not define the sphere of protection or the scope of the embodiments.

It is moreover pointed out that in the sequel of the present description only the elements useful for an understanding of the invention will be described, taking for granted that the machine forming the subject of the invention comprises all the other elements in themselves known for normal operation of a laundry dryer.

In FIGS. 1-4, designated as whole by 1 is a pressure sensor according to the present invention. In the embodiment exemplified, the sensor 1 is a sensor of a relative type, with a sensor body 2, made of electrically insulating material, such as a ceramic material or the like, for example alumina, or a polymeric material. The body 2 is preferably monolithic and has a generally cylindrical shape, with two opposite faces 2a and 2b, as well as some perimetral reference or positioning seats, some of which are designated by 2c. In embodiments that are not represented, the body 2 can have a different shape, for example generally parallelepipedal or in any case prismatic (see, for example, FIG. 20). The sensor body may also comprise a number of parts associated to one another, for example glued or welded, such as a tubular or axially hollow part and a part with a membrane fixes to one end of the tubular part, or yet again—in the case of a sensor of an absolute type—may include a main part defining a blind cavity and an additional membrane element, for example glued, for closing the aforesaid blind cavity (see, for example, FIG. 19).

Figure 1:
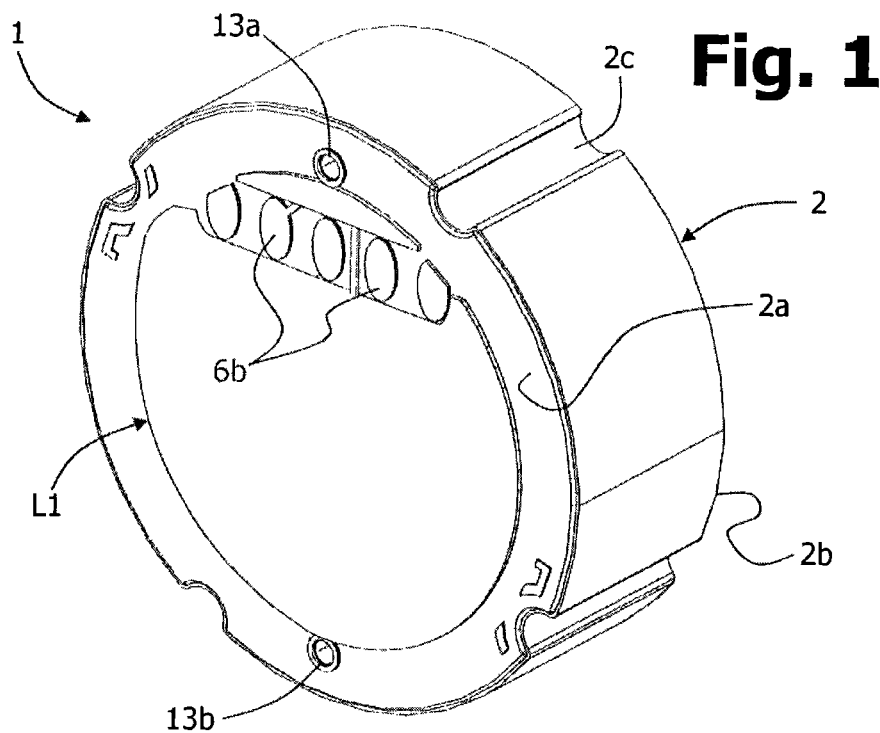
FIGS. 1 and 2 are schematic perspective views, from different angles, of a pressure sensor according to the invention.
Figure 2:
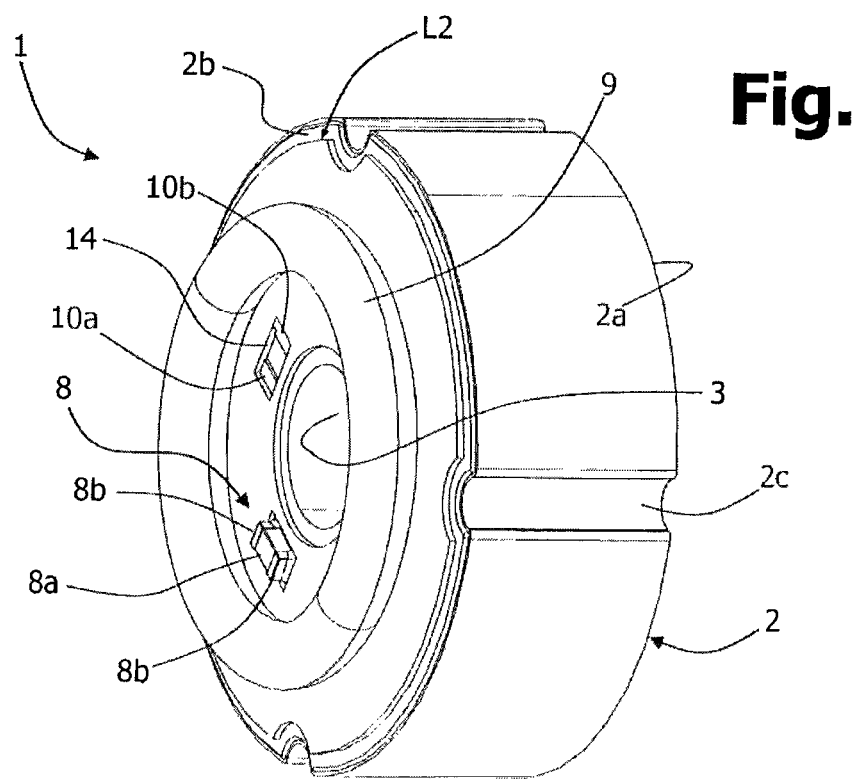
Figure 4:
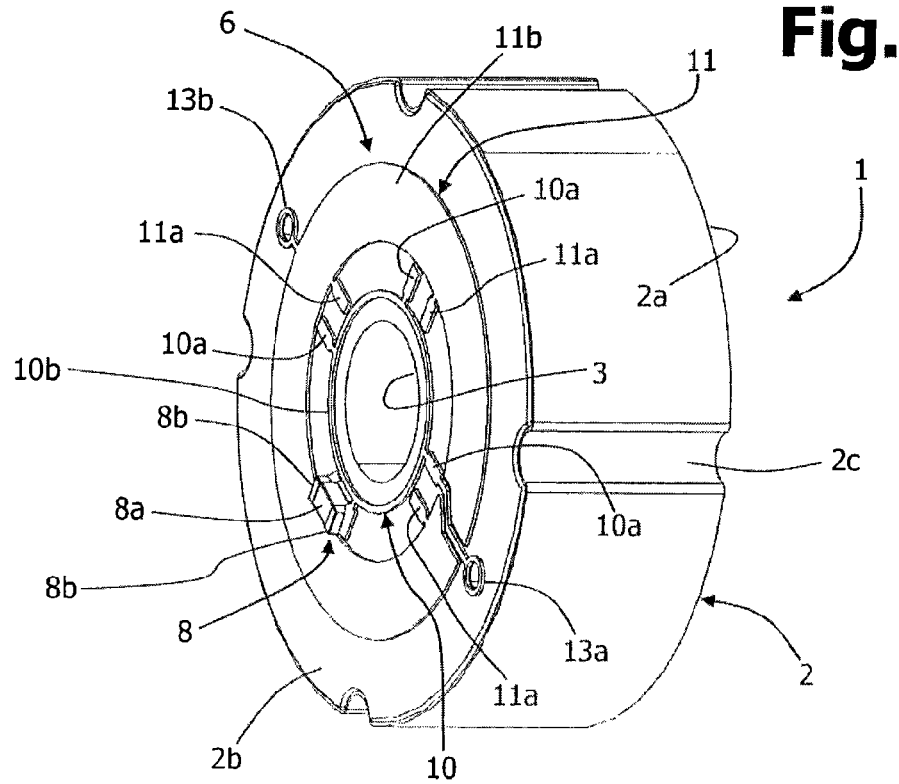

Defined in the body 2 is a blind axial cavity, designated by 3 in FIGS. 2 and 4, which is closed at the face 2a by a corresponding diaphragm portion (clearly visible in FIGS. 12-13, where it is designated by 4) and has, instead, an opening in the face 2b. The cavity 3 is to receive, through its opening in the face 2b, a fluid the pressure of which is to be detected, for example a gas.

Figure 5:
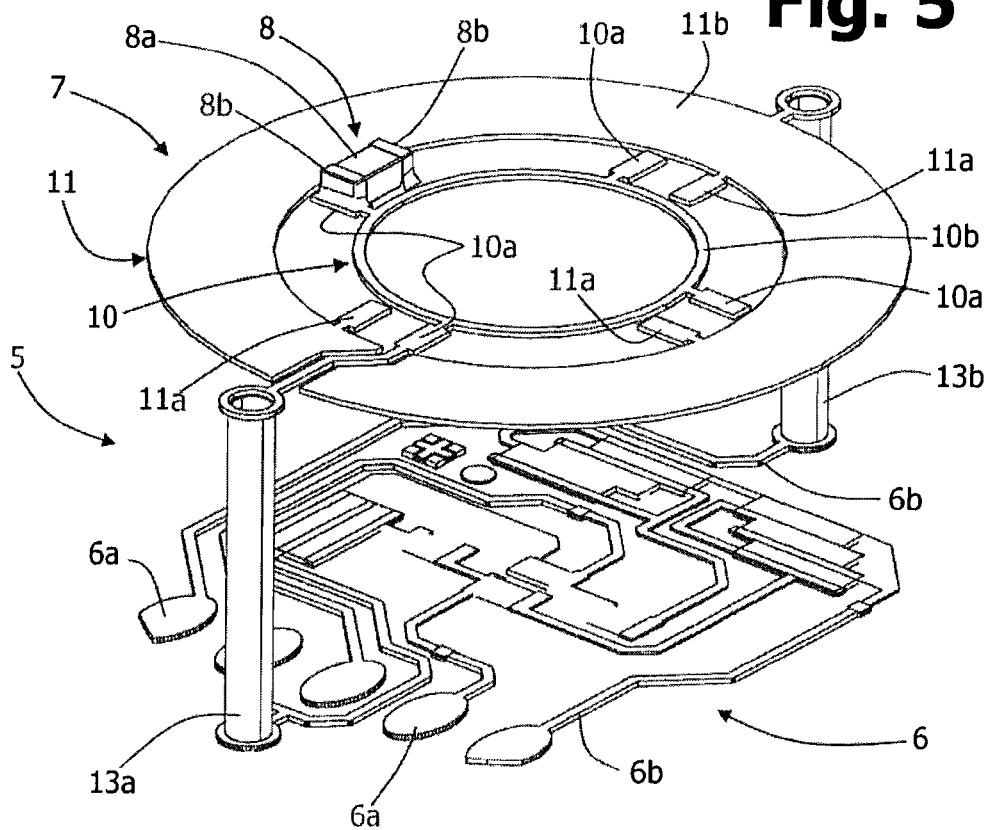
FIG. 5 is a partial and schematic perspective representation of a circuit arrangement of the sensor of FIGS. 1-4.

The pressure sensor 1 further comprises a circuit arrangement supported by the sensor body 2. This arrangement is represented partially and schematically in FIG. 5, isolated from the sensor body, where it is designated as a whole by 5. The circuit arrangement 5 comprises a first electrical-circuit pattern on the face 2a of the body 2, designated as a whole by 6 in FIGS. 3 and 5. The electrical-circuit pattern 6 comprises a plurality of respective tracks made of electrically conductive material, for example a metal or a metal alloy (such as a silver-palladium alloy), serigraphed or in any case deposited on the face 2a of the body 2, on its side external to the cavity 3, as is clearly visible in FIG. 3. In the preferred embodiment, then, the insulating material constituting the body 2 is exploited directly as substrate for at least part of the circuit arrangement 5.

Figure 3:
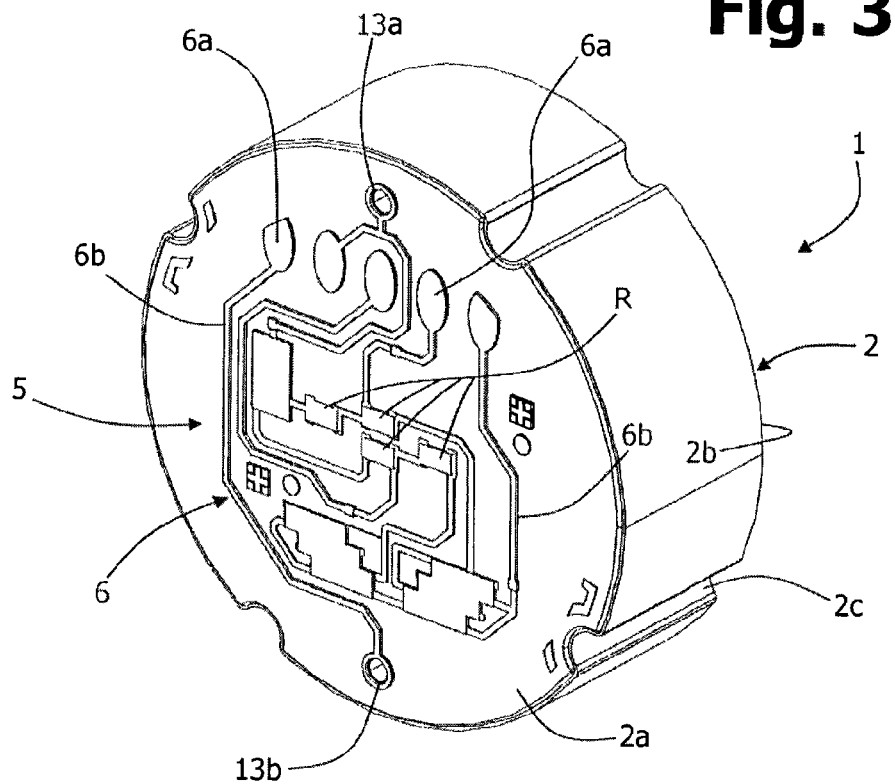
FIGS. 3 and 4 are perspective views similar to the ones of FIGS. 1 and 2, with some elements of the sensor omitted.

Connected to the electrical-circuit pattern 6 is a plurality of corresponding circuit components, amongst which means for detecting bending or deformation of the membrane 3, of any type known in the sector, for example a bridge of resistances or of piezo-resistive elements. Also one or more of these components may be directly formed on the face 2a, such as for example serigraphed resistances. In FIG. 3, some tracks of the electrical-circuit pattern 6 are designated by 6a, whilst designated by 6b are pads for electrical connection of the circuit arrangement 5 to a generic external system. By way of example, designated by R in FIG. 3 are also four resistances forming parts of a resistive sensing bridges, made of resistive material (for example a resistive paste) deposited on the face 2a at the membrane portion 3, in particular in a region thereof subject to elastic deformation, and connected to respective tracks 6a of the electrical-circuit pattern 6. It may be noted that in FIG. 1 the electrical-circuit pattern 6 and the corresponding circuit components are coated with a protective layer L1 made of electrically insulating material, such as a layer of polymeric or vitreous material, except for a region where the external connection pads 6b are located.

Figure 6:
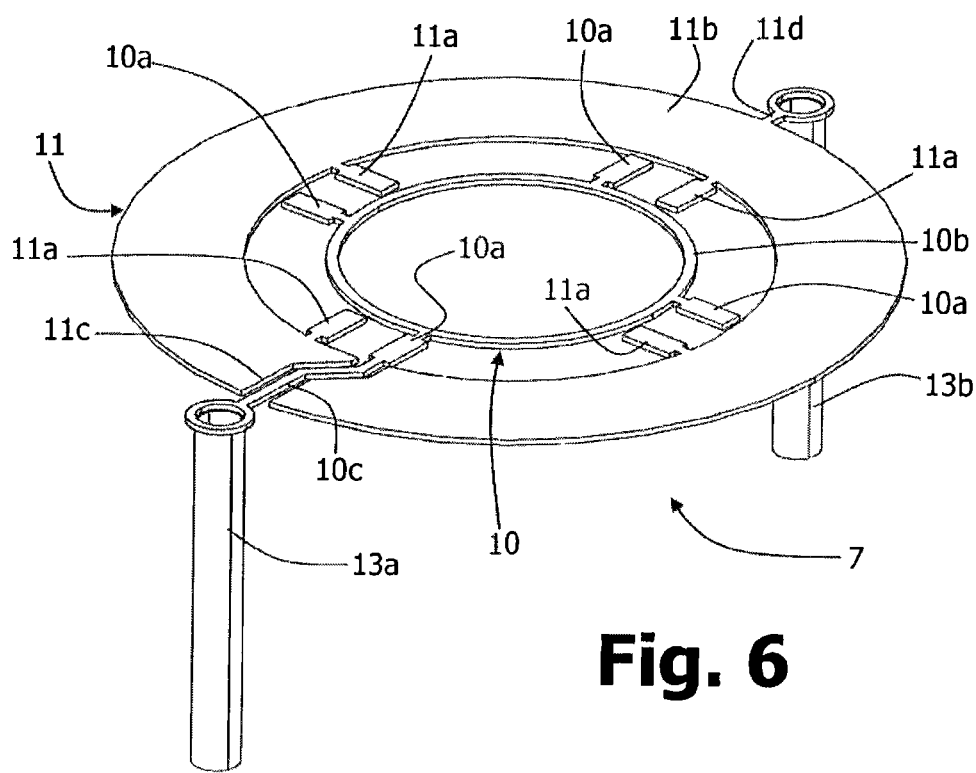
FIG. 6 is a partial and schematic perspective representation of a circuit pattern belonging to the circuit arrangement of FIG. 5.

According to a characteristic of the invention, the circuit arrangement 5 comprises a second electrical-circuit pattern, designated as a whole by 7 in FIGS. 4, 5 and 6, on the face 2b of the body 2, the second electrical-circuit pattern 7 being electrically connected to the first electrical-circuit pattern 6 by connection means 13a, 13b, which extend in an axial direction of the body 2.

The electrical-circuit pattern 7 comprises a plurality of tracks made of electrically conductive material, for example a metal or a metal alloy (such as a silver-palladium alloy), deposited on a region of the face 2b that surrounds at least partially the opening of the cavity 3. Electrically connected to the second electrical-circuit pattern 7 is at least one circuit component, designated by 8, having an active part 8a that is to be exposed to the fluid and at least one first connection terminal 8b and one second connection terminal 8b.

In the example represented, the component 8 is a resistor, such as for example an NTC (negative temperature coefficient) resistor performing functions of temperature sensor, the active part 8a of which (i.e., performing detection functions) is to be exposed directly to the fluid in order to make a direct detection of temperature. Of course, not excluded from the scope of the invention is the use of different types of sensors, not necessarily temperature sensors.

Once again with reference to the example represented, the sensor or resistor 8 is an electronic component of an SMD type. As is known, components of an SMD type are equipped with small metal terminals, for example in the form of metallized pads or pins, which are to be soldered directly on conductive tracks of a circuit, in particular via a soldering paste. In the case exemplified, the connection terminals 8 b of the component 8 are configured as metallized parts at the two longitudinal ends of the active part 8 a; in other embodiments, the terminals 8b could include corresponding pads on the bottom face of the component 8.

It should be noted that in FIG. 2 the electrical-circuit pattern 7 is prevalently coated with a protective layer L2 made of electrically insulating material, such as a layer of polymeric or glassy material, which is open locally at connection pads for the component 8, or in any case shaped so as to leave said pads exposed to enable soldering or connection of the component 8, and/or leave the active part 8a of the component 8 exposed. In the case exemplified (see, for example, FIG. 2) resting directly on the protective layer L2 is an annular gasket 9, in particular of an O-ring type, which circumscribes a region in which the opening of the cavity 3 is located and within which the component 8 is positioned.

According to a further characteristic of the invention, the tracks of the electrical-circuit pattern 7 comprise at least one first track defining, or connected to, a plurality of first pads, and a second track defining, or connected to, a plurality of second pads, for connection of the two terminals of the circuit component represented here by the sensor or resistor 8. In the example represented, the at least two aforesaid tracks are designated by 10 and 11, whilst designated by 10a and 11a are the respective pads, here formed integrally with the aforesaid tracks.

The two tracks 10 and 11 are separated or set at a distance from one another, i.e., not in direct electrical contact. Given that, in the preferred embodiment, at least one significant portion of a track is closer to the cavity 3 and at least one significant portion of the other track is closer to the outer profile of the face 2b of the sensor body 2, they will also be defined in what follows, for simplicity, "inner track" and "outer track", respectively.

In a preferred embodiment, the means that connect the two electrical-circuit patterns 6 and 7 comprise tracks or metallizations in two through holes of the sensor body 2, which extend axially between the faces 2a and 2b. These holes, which are preferably but not necessarily in diametrally opposite positions with respect to the opening of cavity 3, are designated by 12a and 12b only in FIGS. 10-13. On an inner surface of each hole 12a, 12b, there extends a respective layer 13a, 13b made of electrically conductive material, for example of the type already referred to above, which extends throughout the length and/or surface of the corresponding hole 12a, 12b up to its two ends, preferably until it exits on the faces 2a and 2b of the body 2. Depositing of the material of the layers 13a, 13b is then carried out preferentially in such a way that part of the metal or conductive material projects outside the holes 12a, 12b at the corresponding ends. In any case, as may be noted, for example, in FIG. 5, the conductive layer 13a is configured for connecting the inner track 10 of the electrical-circuit pattern 7 to a track 6a of the electrical-circuit pattern 6, whilst the conductive layer 13b is configured for connecting the outer track 11 of the electrical-circuit pattern 6 to a different track 6a of the electrical-circuit pattern 6. For simplicity, in what follows, the connection means between the electrical-circuit patterns 6 and 7 will be defined as "metallized holes".

As an alternative to what has been represented, the holes 12a, 12b could be filled with an electrically conductive material, for example a conductive paste, thus forming electrical track 13a, 13b having a substantially cylindrical shape. Conductive connection layers performing functions as the tracks designated by 13a and 13b could possibly be provided at at least two of the axial grooves 2c of the body 2.

Figure 18:
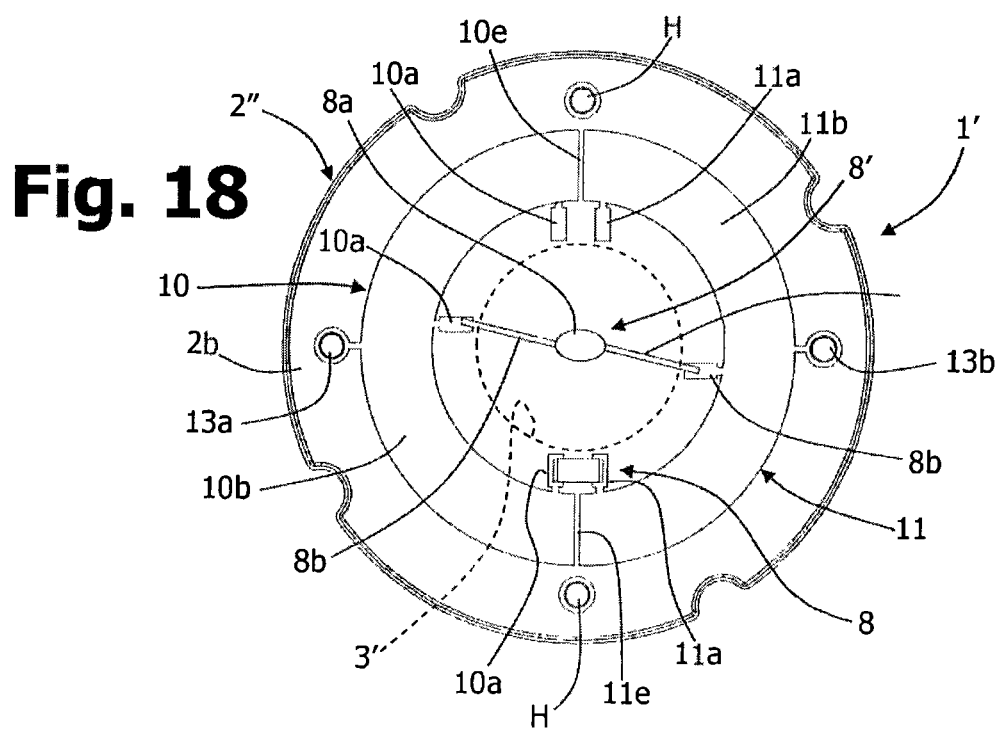
FIG. 18 illustrates, via a view similar to that of FIGS. 7-9, a pressure sensor according to a variant embodiment of the invention.

Irrespective of the specific shapes of the tracks 10 and 11 of the electrical-circuit pattern 7, it is preferable for the inner track to circumscribe at least in part a region of the face 2b that includes at least part of the opening of the cavity 3, with the outer track that circumscribes at least in part a region of the face 2b, extending in which is the inner track. On the other hand, in possible variant embodiments, a track could circumscribe a region of the face 2b that includes a first part of the opening of the cavity 3, while the other track circumscribes a region of the face 2b that includes a second part of the opening of the cavity 3, for example opposite to the first, with the corresponding pads arranged accordingly. For instance, in such an arrangement, the two tracks may be substantially semicircular and set substantially specular, as is illustrated in FIG. 18 (regarding an absolute sensor).

In the preferred example of embodiment (see, for instance, FIG. 6) the inner track 10 has a part 10b with a substantially annular profile, which surrounds the entire opening of the cavity 3. The outer track 11 also has a respective part 11b with a substantially annular profile, which circumscribes a region of the face 2b, where the annular part 10b of the inner track 10 is located. In such an embodiment, at least the annular part 11b of the outer track 11 has an interruption, designated by 11c in FIG. 6, extending through which in a contactless way is a further part 10c of the inner track 10, provided for connection to respective connection means, represented by the metallized hole 12a-13a. A further part 11d, which preferably projects from an outer profile of the annular part of the outer track 11, is provided for connection to the respective connection means, represented by the metallized hole 12b-13b.

It should be pointed out that the term "substantially annular" is here meant to designate also a profile not necessarily closed and/or circular. In the example, as has beets said, the substantially annular part 11b of the track 11 has an interruption 11c. The corresponding part 10b of the track 10 is here effectively annular, but it will be appreciated that also this could include an interruption, without any detriment to the functions of the track 10.

Furthermore, even though in the example the parts 10b and 11b of the two track 10 and 11 extend substantially according to a circumference (i.e., through 360° in the case of the track 10 and through a little less than 360° in the case of the track 11), it will be appreciated that they could instead have a more limited angular extension, i.e., an arc of circumference, for example approximately 270° (in which case it is not indispensable for the outer track to have an interruption). In general, the radius of an arched part of the inner track will be smaller than the radius of a corresponding arched part of the outer track, with the aforesaid arched parts preferably set at equal distances apart.

In the embodiment exemplified, corresponding to the position of each pad 10a, on the side opposite to the opening of the cavity 3, i.e., with a substantially specular arrangement, is a pad 11a.

Irrespective of the specific shape, in the preferred embodiment the outer track has a part with an inner edge, from which the respective pads branch off and extend towards the cavity 3, whilst the inner track has a part with an outer edge, from which the corresponding pads branch off towards the outer profile of the sensor body. With reference to the embodiment illustrated, this characteristic, may be readily appreciated, for example, in FIG. 6, in relation to the inner and outer tracks 10 and 11, with the corresponding pads 10a and 10b.

Once again from FIG. 6, it may be noted how, in one embodiment, the pads of the two tracks of the electrical-circuit pattern 7 extend in an at least approximately radial direction of the face 2b. Once again in FIG. 6 it may clearly be noted how, in a preferred embodiment, the pads of one track are substantially parallel to respective pads of the other track.

Irrespective of the specific shape, according to a characteristic of the invention, the tracks 10 and 11 are prearranged so that the terminals of the circuit component represented here by the sensor or resistor 8 can be connected to the pad 10a and to the pad 11a of any one of a plurality of pairs of pads 10a-11a.

In the specific case of the embodiment illustrated in FIGS. 1-6, the pads 10a and 11a are preferably set in pairs, with the two pads of each pair that are generally parallel to one another. It will be appreciated in fact, for example from FIG. 6, that at least one sensor or resistor 8, in particular of an SMD type, can be connected to any one of the four pairs of pads 10a-11a represented, and of course the number of pairs provided could be different from what has been represented by way of example.

The distance between the pads 10a-11a of each pair may be indicatively comprised between 0.2 and 10 mm, preferably between 0.3 mm and 1.5 mm, in order to enable mounting of a relatively wide range of SMD components.

Irrespective of the specific shape of the inner and outer tracks, according to a preferential characteristic of the invention, the corresponding pads are prearranged for enabling indifferently mounting of at least one circuit component of an SMD type or of at least one circuit component having terminals in the form of rheophores, which are to be soldered to respective pads.

Figure 7:
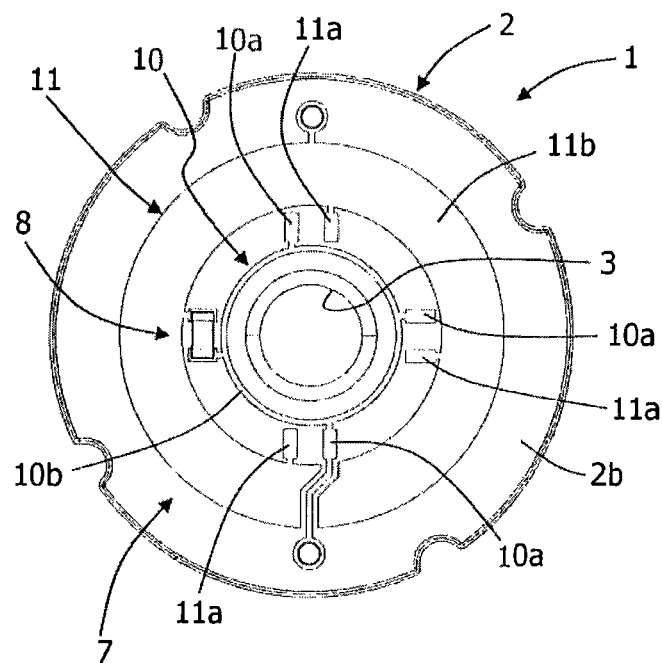
FIGS. 7, 8, and 9 are top plan views of a pressure sensor according to the invention, with some elements omitted, aimed at highlighting possible alternative configurations of mounting of circuit components of a circuit arrangement of the sensor itself.
Figure 8:
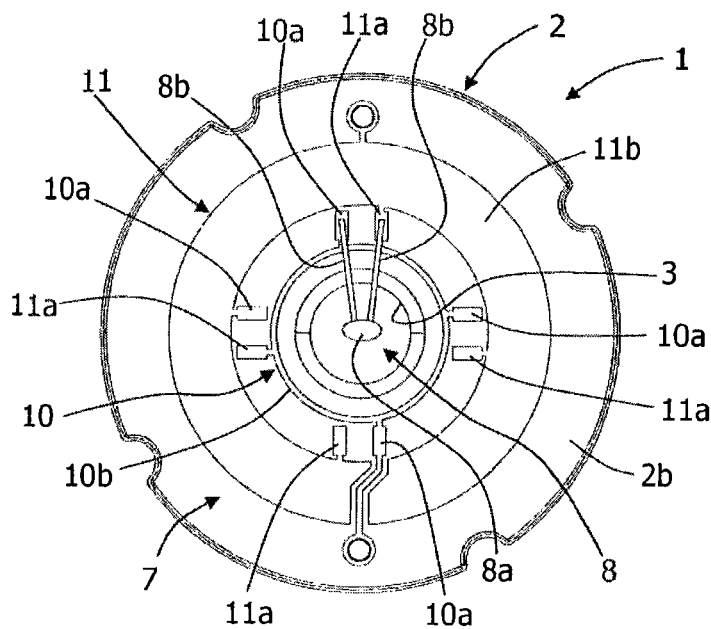
Figure 9:
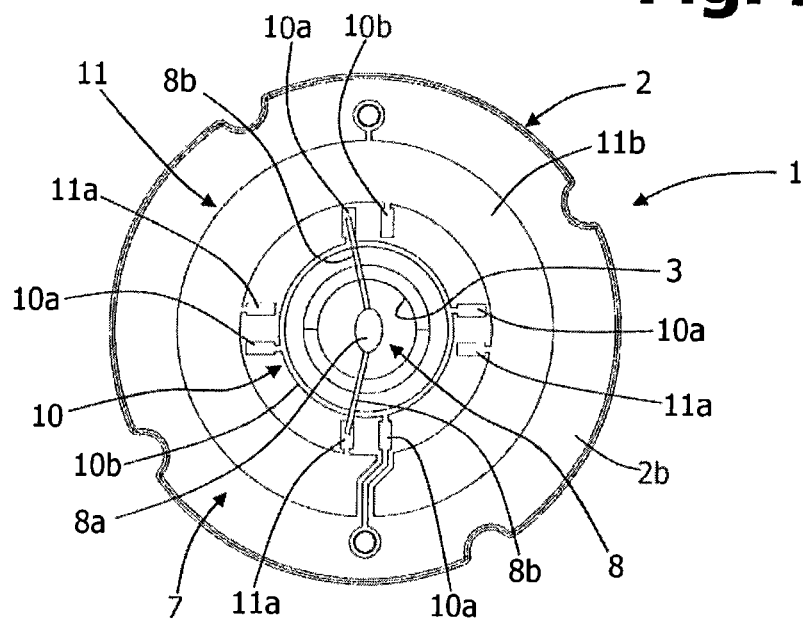

The above characteristic is clearly highlighted in FIGS. 1-5 that have already been described, in relation to mounting of a component of an SMD type on a pad 10a and a pad 11a contiguous to one another, i.e., closer to one another than to other pads. Such a type of assembling is exemplified also in FIG. 7, in plan view. FIGS. 8 and 9 are, instead, schematic illustrations of two different possible configurations of alternative mounting of a circuit component designated by 8', such as an NTC resistor or some other type of sensor or component, the two terminals of which are in the form of rheophores 8b.

Figure 12:
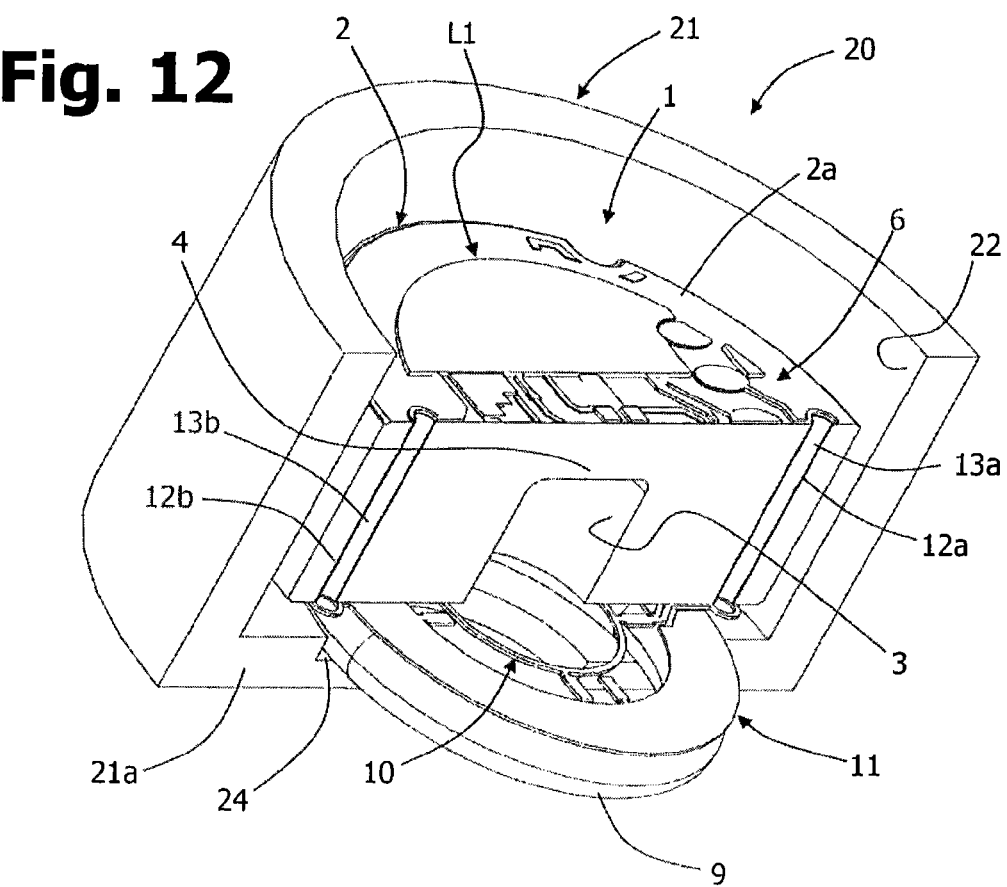
FIGS. 12 and 13 are schematic, perspective, partially sectioned views, of a detection device integrating a pressure sensor of the type illustrated in FIGS. 1-7 and 10-11.

As may be appreciated, the solution according to the invention enables connection of a rheophore 8*b* to any one of the pads 10*a* and the other rheophore 8*b* to any one of the pads 11*a*. For instance, FIG. 12 illustrates the case of use, for this purpose, of the pads 10*a*-11*a* of one of the pairs referred to previously (that can be used as an alternative for mounting of an SMD component), and hence with the two rheophores 8*b* that are relatively close to one another; in such a condition of mounting (see also FIG. 17), the active part 8*a* of the component 8' is generally located at or facing the cavity 3, in particular at its inlet. In the case of FIG. 9, instead, the rheophores 8*b* are markedly divaricated with respect to one another, so as to enable a "bridge" assembling of the component 8' between a pad 10*a* and a pad 11*a* that are located on generally opposite sides of the cavity 3, with the active part 8*a* of the component 8' that projects at least in part directly into the cavity 3 (see also FIG. 15).

It will be appreciated that, also in the case of use of a component 8' with rheophores 8*b*, the component itself with its active part 8*a* is in any case positioned within the region circumscribed by the possible gasket 9 (obviously when such a gasket is necessary in view of the application of the sensor).

As has been said, the electrical-circuit pattern 7 is coated with a protective layer L2 made of electrically insulating material, in particular a vitreous material, applied on the face 2*b* of the body 2.

In the embodiment exemplified in FIG. 2, the layer L2 is deposited—for example via serigraphy—in such a way that at least one part of its upper surface is as a whole substantially plane, where resting directly on said plane surface, if envisaged, is the gasket 9.

According to one embodiment, the layer L2 provides said plane surface via a variable thickness, i.e., has thinner areas in along the tracks 10 and 11, with the corresponding parts 10*a*, 10*b*, 10*c* and 11*a*, 11*b* and 11*d*, respectively, and thicker areas where the tracks 10 and 11 do not extend.

Figure 10:
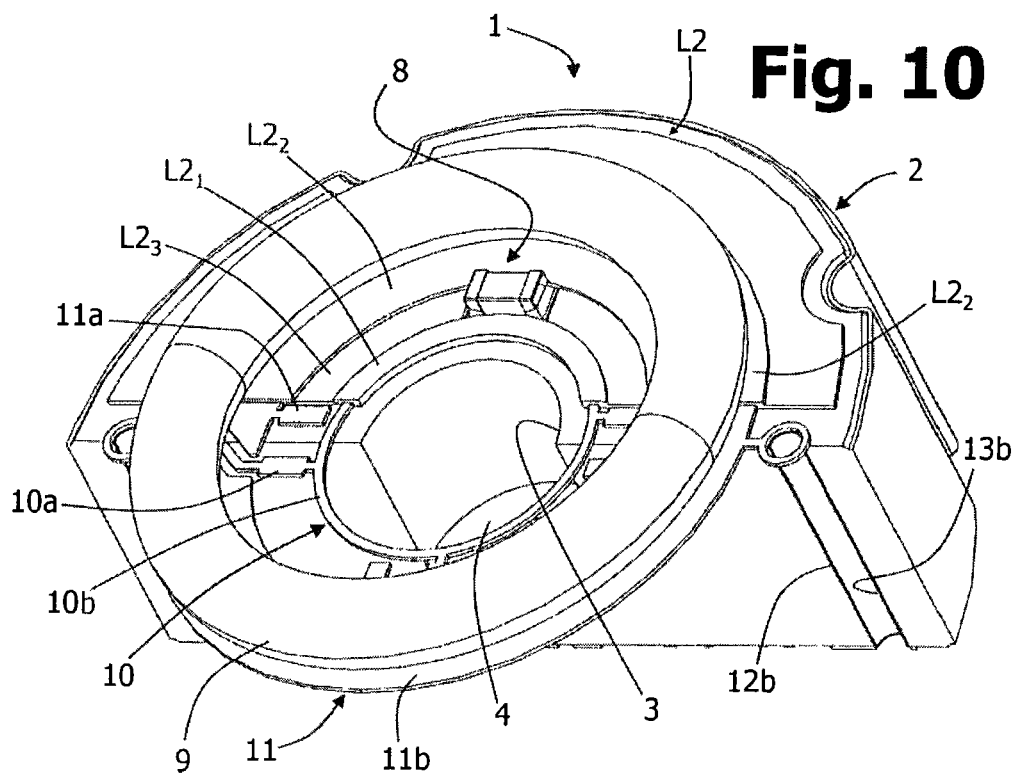
FIG. 10 a schematic, perspective, partially sectioned view of the sensor of FIGS. 1-2.
Figure 11:
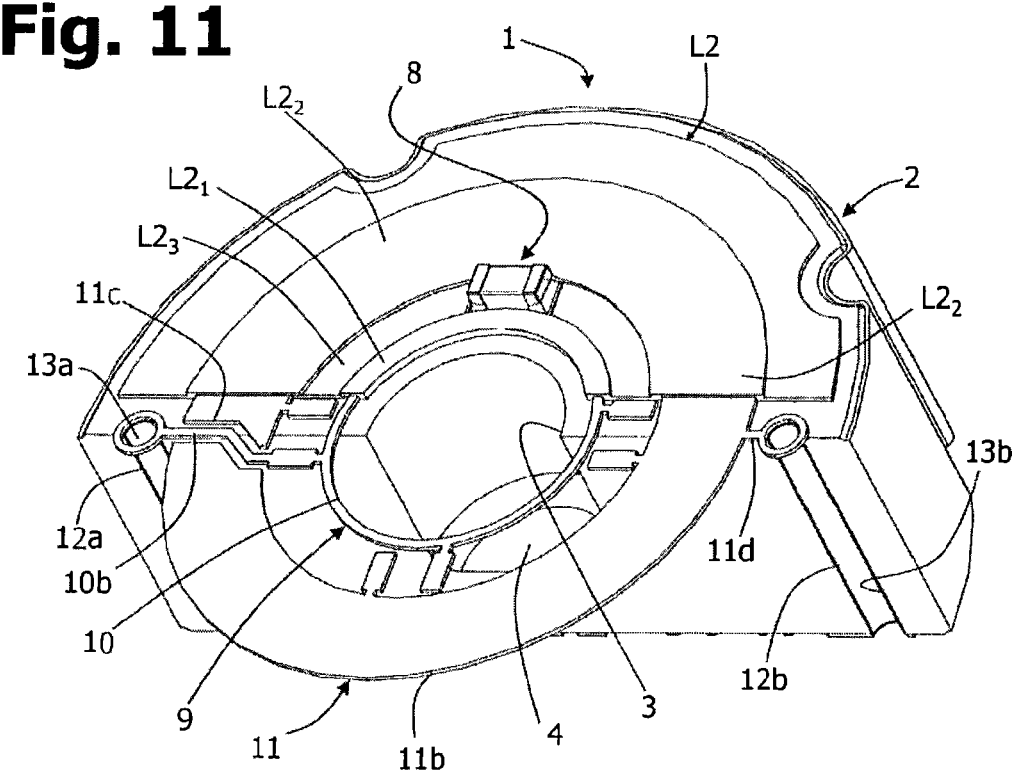
FIG. 11 is a perspective view similar to that of FIG. 10, with a sealing member omitted.

In a different embodiment, such as the one represented schematically in FIGS. 10 and 11, the protective layer L2 is deposited—for example, via serigraphy—so as to have at least one portion in relief, along the tracks 10 and/or 11, designed to provide a plane surface for a sealing element 9.

In the above figures, designated by $L2_1$ and $L2_2$ are portions in relief of the layer L2 that coat the parts 10*b* and 11*b* of the tracks 10 and 11, respectively, whereas designated by $L2_3$ is a prevalently lowered portion, intermediate with respect to the portions $L2_1$ and $L2_2$, and corresponding to the region in which the pads 10*a* and 11*a* extend. Possibly, also the areas of the portion $L2_3$ corresponding to the pads 10*a*, 11*a* of the layer L2 may be in relief. In the example, since the parts 10*b* and 11*b* are substantially annular, also the portions $L2_1$, $L2_2$ and $L2_3$ have a substantially annular profile.

As may be appreciated, both in the case of FIG. 2 and in the one illustrated in FIGS. 10 and 11, part of the material of the layer L2 penetrates between the tracks 10 and 11 (including the relatively small spaces existing between the interruption 11*c* and the part 10*c* of the two tracks—FIG. 6), thereby levelling the layer L2 also in this area, to form the aforesaid plane sealing surface, moreover guaranteeing also electrical insulation between the tracks themselves.

As may be noted, preferentially, at least one of the parts in relief, such as the part $L2_2$, has a width such that on its upper surface the gasket 9 can rest in order to exert its own sealing action. In the case illustrated, the part in relief in question is the one designated by $L2_2$, corresponding to the outer track 11 of larger diameter.

It should be pointed out that, in general terms, the distance between the tracks 10 and 11 in areas of interruptions of the type designated by 11*c* is very small. With reference, for example, to the case represented, the distance between each end of the track 11, at the interruption 11*c*, and the part 10*c* of the track 10 is indicatively comprised between 0.1 and 1 mm, preferably between 0.1 and 0.5 mm. In this way, the depression existing between the two tracks at the interruption is very small and can be filled by part of the layer $L2_2$ in the absence of significant depressions. In other words, the gaps between the tracks at the interruption are so small that, even when a layer L2 of substantially constant thickness is applied, the upper surface of the portion $L2_2$ is substantially levelled also at the interruption, thus guaranteeing effective sealing by the gasket 9. To this effect there may contribute also the viscosity of the insulating material deposited and the forces of cohesion between the parts involved. In this perspective, the layer L2 can be obtained via a single passage of deposition of the protective material, preferably a passage of serigraphic deposition, obtaining in any case the aforesaid part in relief and/or of uniform rest to ensure fluid tightness, such as the layer part $L2_2$ in relief with respect to the layer part $L2_3$.

In one embodiment, the protective layer L2 is open locally; i.e., it has one or more windows, some of which designated by 14 in the figures. In the case of the embodiment illustrated in FIGS. 1-11, at least one window 14 is at at least two pads of the two tracks, i.e., a pad 10*a* and a pad 11*a*, in the example illustrated, so as to enable subsequent mounting of the component 8. On the other hand, deposition of the protective layer L2 can also be carried out following upon mounting of the component 8; in this case, the layer will be deposited so as to leave at least the active part 8*a* of the component 8 exposed and hence without the windows 14.

The sensor illustrated in FIG. 2, where the layer L2 has a number of windows 14, can be preferably used for detection of pressure of gases and/or liquids that are not electrically conductive and/or not aggressive from the chemical standpoint; in the case, instead, where the fluid the pressure of which is to be detected is a gas or a liquid that is electrically conductive and/or aggressive from the chemical standpoint, it is preferable for the layer to be deposited after mounting of the component 8 so as to coat all the tracks and/or the areas of soldering and/or the terminals of the component 8 to prevent electrical portions from remaining exposed to the fluid.

On the other hand, also in the case of FIG. 2, the component 8 can be mounted after deposition of the layer L2, which will be followed by a further deposition of a protective material (not necessarily having the same composition as the one that constitutes the layer L2), for sealing possible gaps remaining in the component 8 and the corresponding window 14, as well as for occluding the other window 14 not used. Similar considerations apply to the case of mounting of a component with rheophores, for example of the type designated by 8' in FIGS. 8 and 9.

Figure 13:
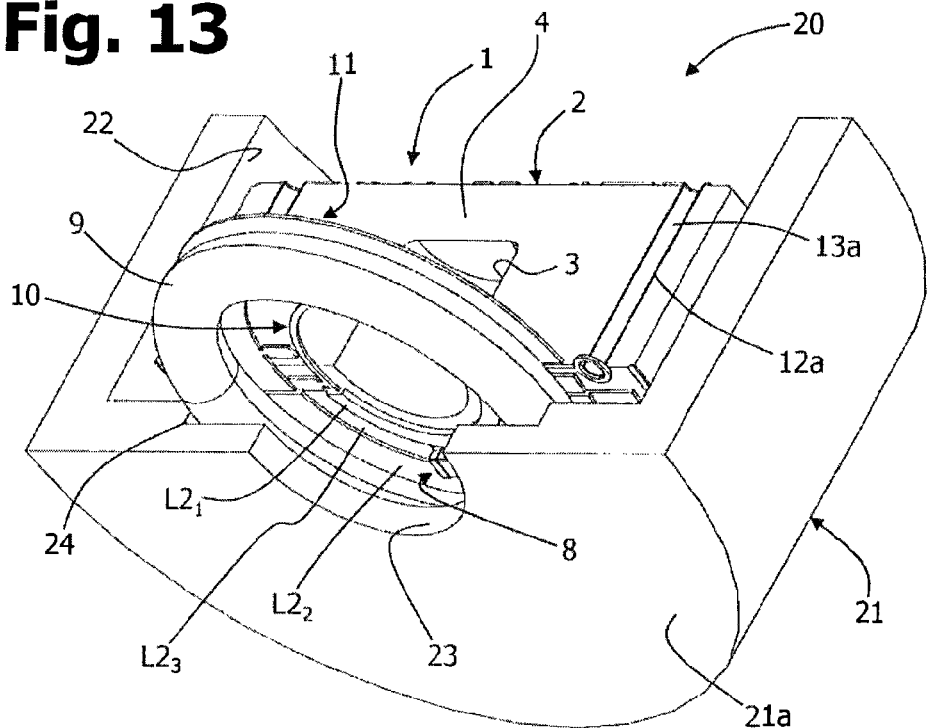

FIGS. 12 and 13 are schematic illustrations of an example of device for detection of the pressure of fluids that integrates a pressure sensor according to one of the embodiments described, and especially a sensor 1 with protective layer L2 of the type described with reference to FIGS. 10-11. Such a device, designated as a whole by 20, can find use, for example, in the automotive sector, or in the domestic sector and the sector of electrical household appliances, and the air-conditioning sector and the hydro-thermal-sanitary sector.

The device 20 has at least one casing body, designated as a whole in FIGS. 12 and 13 by the reference 21, defining a housing 22 for the sensor 1. At an end wall 21a of the body 21, a passage 23 is provided, which constitutes an inlet for the detection of pressure, i.e., an inlet that is to be connected to a circuit where the fluid of which the pressure and temperature are to be detected is located (assuming that the component 8 is a temperature sensor).

Preferably, but not necessarily, on the side of the wall 21a that is internal to the casing body 21 a seat 24 is defined at the passage 23, for positioning of the gasket 9. The body 2 of the sensor 1 is mounted in the housing 22 in such a way that at least one side of a membrane portion thereof 3 is exposed to the fluid, and the gasket 9—if envisaged—is operatively set between the wall 21a, i.e., between surfaces of its seat 24, and the bottom face 2b of the sensor body 2, in particular of its protective layer or flat surface L2.

In this way, as may be appreciated, the fluid at inlet from the passage 23 can reach the cavity 3 of the sensor body 2, thereby filling also the space that the gasket 9 delimits between the bodies 2 and 21, where the component 8 is located.

General operation of the device 20 and of the pressure sensor 1 is according to known modalities, and consequently will not be described in detail herein. The mechanical deformation of the diaphragm portion 3, due to the pressure of the fluid being measured is detected by the corresponding detection means; for example, with reference to the case of FIG. 3, bending of the diaphragm portion 3 modifies a value of resistance at output from the bridge of resistances R. The circuit arrangement 5, and precisely the part thereof that includes the electrical-circuit pattern 6 with the associated components, generates an output signal of the aforesaid detection means and possibly treats it according to modalities in themselves known (possible amplification, and/or conditioning, and/or processing), rendering it then available on the outside via the pads 6b illustrated in FIG. 1, possibly connected to an appropriate electrical connector associated to the casing 21 of the device 20.

The fluid, as has been said, is free to penetrate also into the area where the component 8 is located. Assuming that the component 8 is a temperature sensor, for example of a resistive type, the value of resistance at output from it is transferred, by means of the tracks 10, 11 and of the metallized holes 12a-13a and 12b-13b, to the part of the circuit arrangement 5 including the electrical-circuit pattern 6, possibly configured for controlling and conditioning also the signal of the sensor 8, rendering it then available on the outside via the pads 6b illustrated in FIG. 1, possibly connected to an appropriate electrical connector associated to the casing 21 of the device 20.

Figure 14:
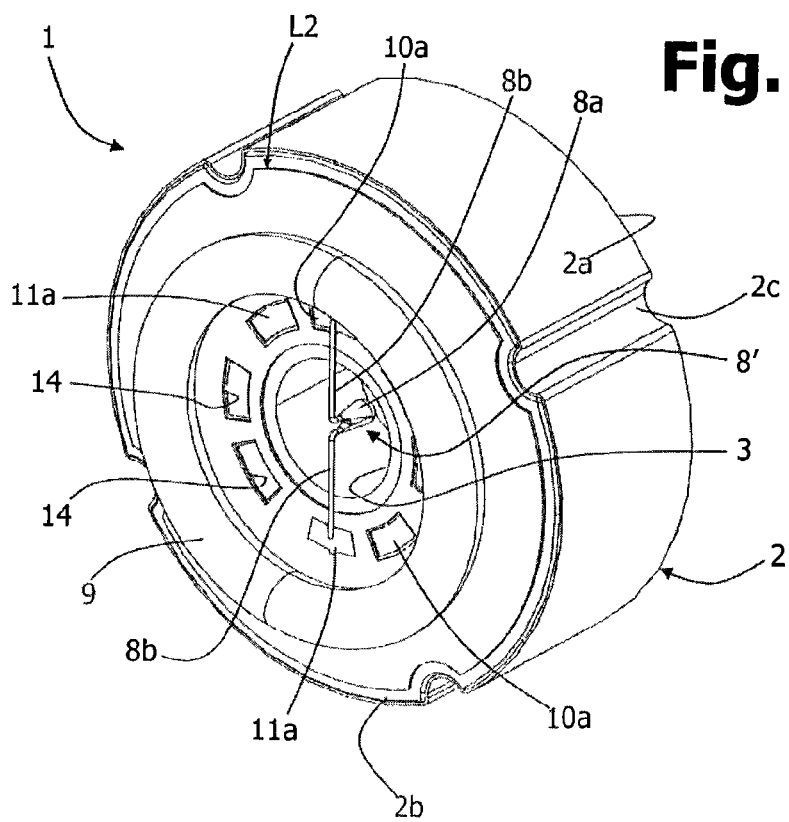
FIGS. 14 and 15 are views similar to those of FIGS. 2 and 4, regarding a pressure sensor obtained according to a second embodiment of the invention.
Figure 15:
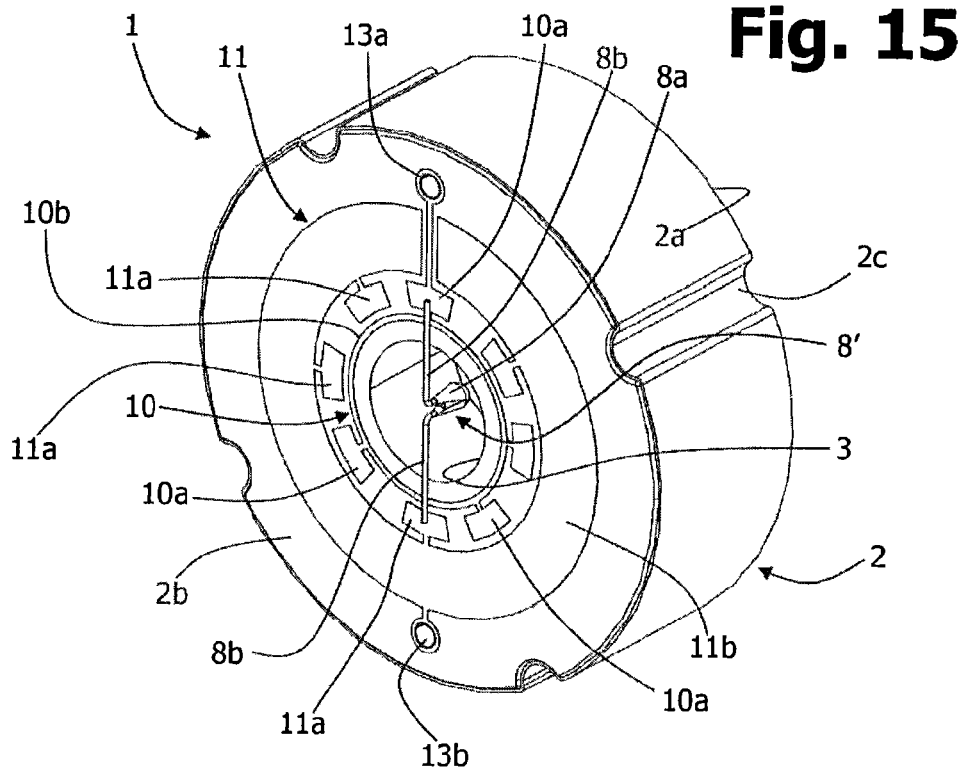
Figure 16:
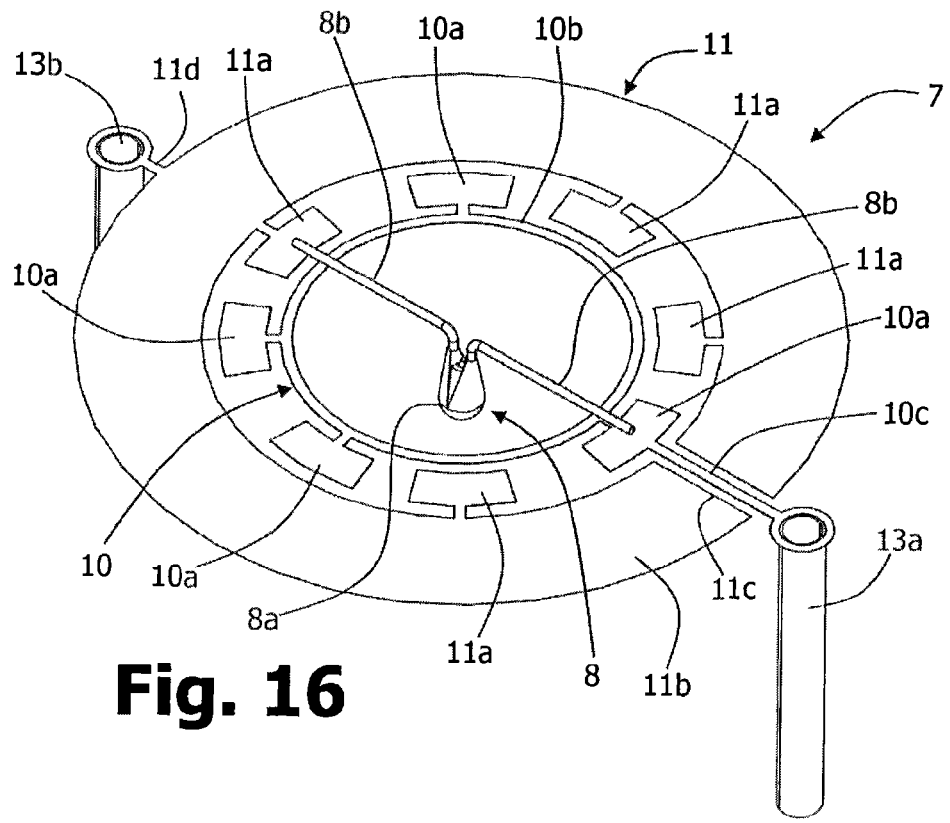
FIG. 16 is a view similar to that of FIG. 6, but regarding the sensor of FIGS. 14-15.

FIGS. 14, 15, and 16 illustrate, with views similar to those illustrated in FIGS. 2, 4, and 6, a possible variant embodiment of the invention. In these figures the same reference numbers as those of the previous figures are used to designate elements that are technically equivalent to the ones already described above.

In the variant illustrated in FIGS. 14-16, the pads 10a and 11a of the tracks 10 and 11 have a substantially arc-like configuration, extending preferentially in an at least approximately radial direction of the face 2b of the sensor body 2. Also in this case, preferentially corresponding to the position of each pad 10a, on the opposite side of the opening of the cavity 3, i.e., set according to a substantially specular arrangement; is a pad 11a. Preferentially, but not necessarily, the pads are set in pairs, i.e., with one pad 10a and a respective pad 11a that are closer to one another than to other pads.

In this way, in addition to components with rheophores, also a component of an SMD type, such as the one previously designated by 8, can be connected to any one of the four pairs of pads 10-11a represented (of course, the number of pairs provided could be different from what has been exemplified), as has been described with reference to the embodiments illustrated in FIGS. 1-13. Also in such an embodiment, the distance between the pads 10a-11a of each pair may be indicatively comprised between 0.2 and 10 mm, preferably between 0.3 mm and 1.5 mm in order to enable mounting both of components with rheophores and of a relatively wide range of SMD components.

Figure 17:
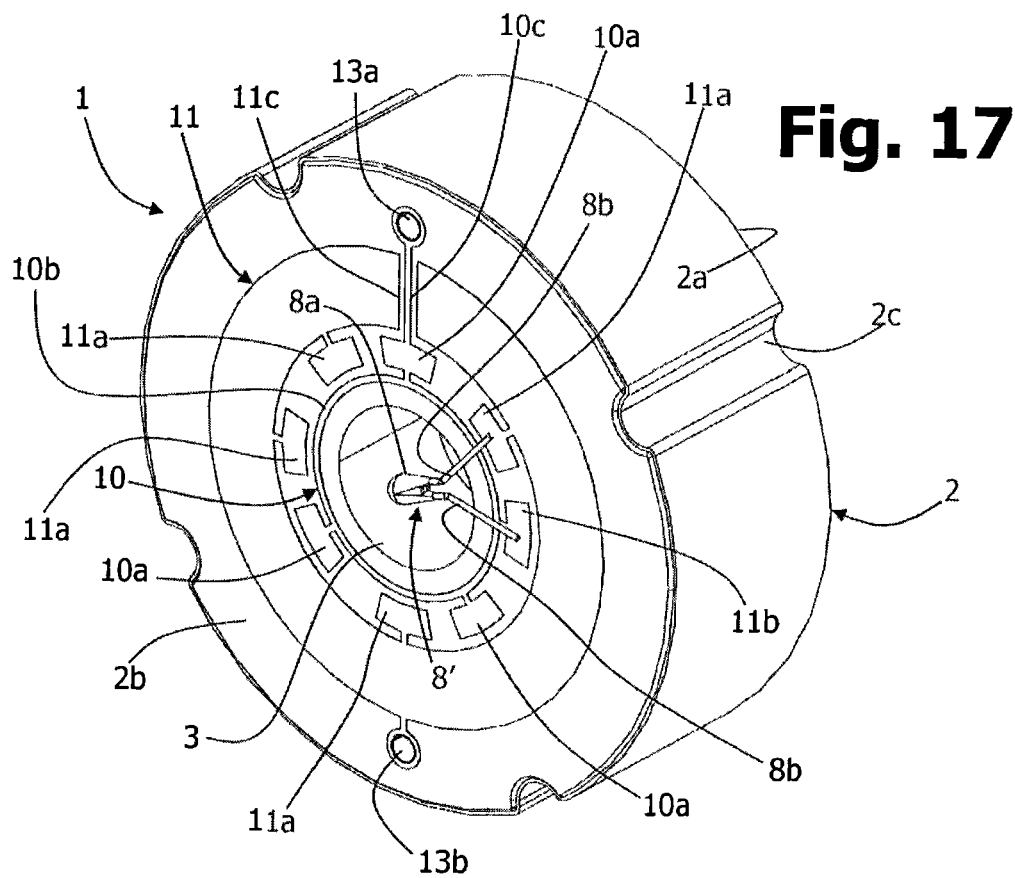
FIG. 17 is a view similar to that of FIG. 15, but with a different configuration of mounting of a circuit component thereof.

In the specific case represented in FIGS. 14-16 the sensor 1 is equipped with a component of the type previously designated by 8', which may be a generic resistor or sensor, such as a temperature sensor. In the case of FIGS. 14-16, the rheophores 8b are markedly divaricated with respect to one another to enable a "bridge" mounting of the component 8' between a pad 10a and a pad 11a that are located on generally opposite sides of the opening of the cavity 3. As has been said with reference to the example of embodiment illustrated in FIG. 9, in this way the active part 8a of the component 8' can project at least at the cavity 3 of the sensor body 2 or directly therein. FIG. 17 illustrates the same sensor 1 illustrated in FIGS. 14-16, but with the component 8' mounted in a configuration similar to the one illustrated in FIG. 8, i.e., with the two rheophores 8b that are relatively close to one another, for their connection to pads 10a-11a contiguous to one another, i.e., belonging to one of the pairs previously referred to; in such a condition of mounting the active part 8a of the component 8' is set generally facing the cavity 3.

Also a sensor 1 according to FIGS. 14-17 is provided with a corresponding protective layer L2, which may be open locally, i.e., provided with a plurality of windows. In the case of FIG. 14, the windows 14 are each at a corresponding pad so as to enable mounting of the component 8' after deposition of the layer L2. In the case of mounting of a component of an SMD type, the windows may extend astride of two contiguous pads 10a-11a, leaving at least one part thereof necessary for connection of the terminals of the component of an SMD type exposed.

As has been described previously in relation to FIGS. 1-13, on the other hand, also in this case deposition of the protective layer L2 may be carried out following upon mounting of the component 8' (for 8); in this case, the layer L2 can be deposited so as to coat all the pads 10a, 11a completely, as well as a part of the soldering and/or of the terminals or leads 8b (similar considerations obviously apply also in the case of FIGS. 8 and 9).

In the case of use of the sensor 1 illustrated in FIGS. 14-17, in combination with the fluids not electrically conductive and not aggressive from the chemical standpoint, the windows 14 may be left open, whereas otherwise the layer L2 is deposited after mounting of the component 8' to coat all the pads and part of the rheophores 8b or, in the case where the component 8' is mounted after deposition of the layer L2, there may follow a further deposition of a protective material (for example, a sealing paste) to close all the windows 14 and coat the part of the rheophores 8b at the corresponding portion of soldering to the corresponding pads 10a and 11a.

FIG. 18 illustrates, with a view similar to the one of FIGS. 7-10, an embodiment in which the two tracks 10 and 11 have a substantially semicircular configuration and are set in a substantially specular way to form an as a whole annular profile or shape. In this figure the same reference numbers as those of the previous figures are used to designate elements that are technically equivalent to the ones already described. FIG. 18 illustrates, by way of example, also the possibility of mounting a component 8 of an SMD type and/or a component 8' with rheophores 8b.

In such an embodiment, present between the ends of the two tracks 10 and 11 are corresponding interruptions or free spaces, here designated by 10e and 11e. As has been mentioned previously, the distance between two facing ends of the tracks may be indicatively comprised between 0.1 and 1 mm, preferably between 0.1 and 0.5 mm. In this way, also following upon deposition of a single protective layer of the type designated previously by L2 (and especially of its part $L2_2$), its upper surface will be substantially flat in order to guarantee a suitable sealing action for a gasket of the type previously designated by 9.

It should be noted that the sensor illustrated herein, designated by 1', has the structure typical of an absolute pressure sensor, i.e., with a substantially closed chamber or cavity 3', but the concepts set forth may evidently be applied also in sensors such as the ones described with reference to FIGS. 1-17, i.e., having a cavity open at an axial end, or even different sensors.

Figure 19:
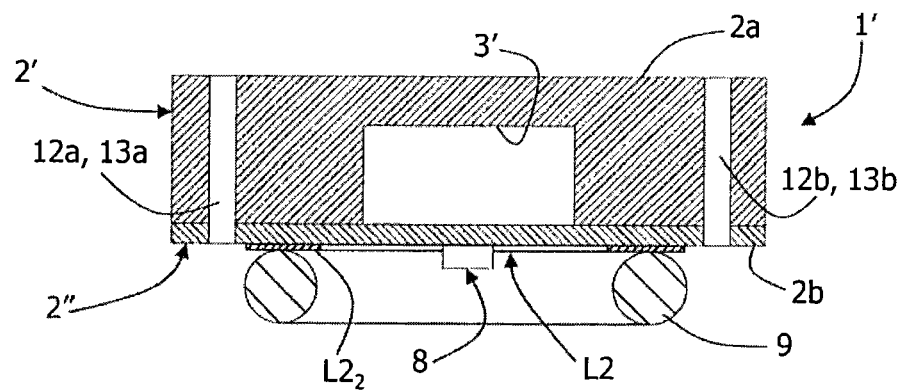
FIG. 19 is a partial schematic cross-sectional view and of a pressure sensor of the type illustrated in FIG. 18.

FIG. 19 is a schematic cross-sectional view of a sensor 1' like the one illustrated in FIG. 18, or rather having a sensor body including a main part 2' that defines a substantially blind cavity 3', applied (for example glued) at one end of which is a membrane part 2", which in practice provides at least the face 2b of the sensor body, on which the tracks 10 and 11 (here not represented) are deposited.

FIG. 19 illustrates schematically mounting of a component 8 of an SMD type, as well as the presence of the protective layer L2, with its annular part $L2_2$ that coats the tracks 10 and 11. The aforesaid part $L2_2$ is hence as a whole annular, preferably substantially concentric or coaxial to the cavity 3', and resting on its surface is a sealing element, such as a gasket 9.

In an embodiment of this sort, at least past of the components of the first electrical-circuit pattern, such as the means for detecting the elastic deformation of the diaphragm element at the cavity 3', are provided on the inner side of the diaphragm element 2", i.e., inside the cavity itself, or integrated in its body. These components or means, for example a bridge of resistances, can be connected to the remaining part of the first electrical-circuit pattern (here not shown) present on the face 2a of the sensor body 2'-22 by means of corresponding conductive tracks and metallized holes (an example of arrangement of these metallized holes is visible in FIG. 18, where they are designated by H). On the other side, also in this type of embodiment the metallized holes 12a-13a and 12b-13b are provided for electrical connection of the tracks 10 and 11 to the circuit part present on the face 2a. As emerges, in this case, a part of the metallized holes 12a-13a and 12b-13b is a through part passing also through the diaphragm element 2".

Obviously, the arrangement of the sensor body 2' and 2" could be the reverse of the one exemplified, or rather with the diaphragm part provided with the detection means that is defined integrally by the main part 2' and by the part 2" that constitutes an element for closing the cavity 3'.

Figure 20:
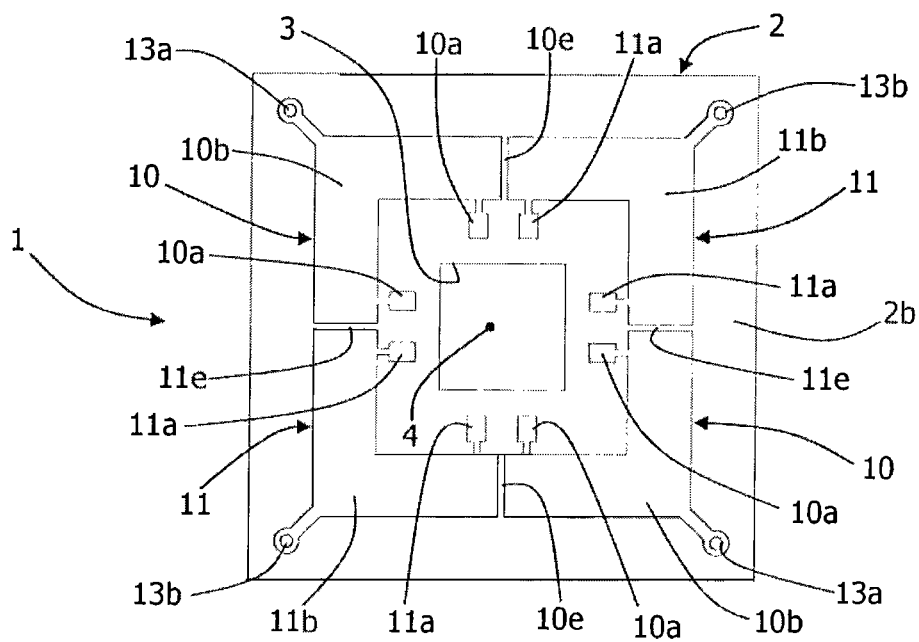
FIG. 20 illustrates, via a view similar to that of FIGS. 7-9, a pressure sensor according to a further variant embodiment of the invention.

FIG. 20 is a schematic illustration of a further embodiment, where the sensor body 2 has a generally square shape, instead of a cylindrical one. The same reference numbers are used in FIG. 20 as in the previous figures to designate elements that are technically equivalent to the ones already described above. In the example, also the blind cavity 3' has a substantially square profile even though this profile could also be circular; obviously, shapes of this type may be used also in relation to the previous embodiments, with the tracks 10 and 11 modified accordingly, if necessary.

FIG. 20 illustrates also a further variant embodiment, according to which the tracks 11 of the electrical-circuit pattern 7 are more than two, preferably but not necessarily in an even number, for example four (but they could even be only three), with corresponding metallized holes 12a-13a, 12b-13b for connection to the rest of the circuit arrangement. Preferentially, the tracks 10, 11 are coupled so as to form a substantially annular profile, here square, preferably for girding the central area of the face 2b as a whole, at the cavity 3 (the aforesaid annular profile is here substantially concentric or coaxial to the cavity). It will be appreciated that such a type of arrangement can be used also in the case of an absolute pressure sensor. In the example, the individual tracks 10, 11 have a substantially L-shaped profile, but it will be appreciated that they could have a different profile, for example shaped like an arc of circumference, or in any case generally curved, with corresponding interruptions or free spaces 10e and 11e. As may be appreciated, also in this case the tracks 10, 11 can be covered as a whole by a protective layer like the one designated previously by L2, having a respective part like the one previously designated by $L2_2$, which defines a substantially plane resting surface or in any case a uniform resting surface for an annular sealing element, such as a gasket.

In the case of the example illustrated to FIG. 20, the aforesaid part of the protective layer, as well as the corresponding gasket, will have a substantially square profile (possibly with rounded corners). As has been said, on the other hand, in the case of tracks 10 and 11 shaped like an arc of circumference, both the aforesaid part of the protective layer and the sealing element may have a substantially circular profile.

From the foregoing description the characteristics of the present invention emerge clearly, as likewise do its advantages, principally represented by the simplicity and low cost of the solution proposed, as well as by its high degree of flexibility, in relation to the possibility of installing different types of circuit components designed for direct exposure to the fluid, also in different configurations, and/or by its reliability, in relation to the particular structure designed to enable also a good fluid tightness.

It will be appreciated that the invention is extremely advantageous from the standpoint of management of manufacture and production supplies, in so far as it enables—starting from one and the same basic structure of the pressure sensor—handling of a wide range of product variants, differentiated from one another as regards the type and/or configuration of mounting of a circuit component designed for direct exposure to the fluid the pressure of which is to be measured.

It is clear that numerous variant embodiments of the pressure sensor described by way of example herein may be devised by the person skilled in the art, without thereby departing from the scope of the invention as defined in the annexed claims.

The tracks 10 and 11 and/or the protective layer L2 can be obtained on the sensor body 2 with techniques other than serigraphy, even though this is the preferred technique; for example, alternative techniques in this sense may be selected from among lithography, photo-lithography, spraying of conductive material, surface metallization, plating, etc.

In a possible embodiment, the two tracks 10 and 11 may be closed-loop tracks, with an arrangement like the one illustrated in FIGS. 1-17, without the outer track 11 having necessarily to be provided with an interruption. In such an embodiment, for example, the metallized hole 12a-13a may be defined in the sensor body 2 in such a way that its end corresponding to the face 2b is located within the region circumscribed by the outer track 11, which may hence have a closed profile, i.e., without any interruption. In such an embodiment, it is preferable for the hole 12a of the sensor body to be filled with a conductive material 13a, also for in order to facilitate the subsequent step of deposition of the protective layer L2.

Finally, it will be appreciated that, in possible variant embodiments, the sensor forming the subject of the invention may be equipped with a plurality of additional components of the type previously designated by 8 and/or 8', such as resistors or sensors, for example with electrical connection in parallel or else via a connection to further pads and tracks of the type exemplified (see, for example, FIG. 20). For such a case, for instance, there could be provided a common annular inner track (ground track) and a plurality of outer signal tracks, for example describing the arc of a circle, which as a whole form a substantially concentric annular profile with respect to the inner track.

The circuit components that are to be electrically connected to at least two tracks of the second electrical-circuit pattern may obviously be of various types.

The invention claimed is:

1. A pressure sensor comprising a sensor body made at least in part of electrically insulating material, having a first face and a second face opposite to each other and an axial cavity, the axial cavity being closed at the first face by a corresponding diaphragm portion and having an opening at the second face, the cavity being designed to receive, through the opening thereof, a fluid the pressure of which is to be detected, the pressure sensor also comprising a circuit arrangement supported by the sensor body and including:
a first electrical-circuit pattern, comprising a plurality of respective tracks of an electrically conductive material deposited on the first face, on its side external to the cavity, there being connected to the first electrical-circuit pattern a plurality of first circuit components, amongst which a detection arrangement for detecting bending or deformation of the diaphragm portion;
a second electrical-circuit pattern, comprising a plurality of respective tracks made of electrically conductive material deposited on a region of the second face that surrounds at least partially the opening of the cavity, there being connected to the second electrical-circuit pattern at least one second circuit component having an active part, designed to be exposed to the fluid, and at least one first and one second connection terminal;
connection elements, which electrically connect the first electrical-circuit pattern to the second electrical-circuit pattern and that extend at least in an axial direction of the sensor body,
wherein the tracks of the second electrical-circuit pattern comprise at least one first track defining a plurality of first pads and at least one second track defining a plurality of second pads, for connection of the first terminal and of the second terminal of the second circuit component, respectively,
and wherein the first and the second tracks are prearranged in such a way that the first terminal and the second terminal of the second circuit component are connectable to any of the first pads and to any of the second pads, respectively, and/or to the first pad and to the second pad, respectively, of any of a plurality of pairs of first and second pads.

2. The pressure sensor according to claim 1, wherein the connection elements comprise a first through-hole and a second through-hole of the sensor body, which extend axially between the first face and the second face, and wherein
on an inner surface of the first through-hole and on an inner surface of the second through-hole there extend a first layer and a second layer of electrically conductive material, respectively, the first layer connecting the first track and/or the first pads of the second circuit pattern to a first track of the first circuit pattern and the second layer connecting the second tracks and/or the second pads of the second circuit pattern to a second track of the first circuit pattern.

3. The pressure sensor according to claim 1, wherein the first pads and the second pads are prearranged for enabling indifferently assembling of a second circuit component of an SMD type or of a second circuit component whose first terminal and second terminal are rheophores, welded to a first pad and to a second pad, respectively.

4. The pressure sensor according to claim 1, wherein the second circuit component is a resistor or a sensor.

5. The pressure sensor according to claim 4, wherein the resistor or the sensor is an NTC-type resistor.

6. The pressure sensor according to claim 4, wherein the sensor is a temperature sensor.

7. The pressure sensor according to claim 1, wherein the first track circumscribes at least in part a region of the second face, which includes at least one first part of the opening of the cavity of the sensor body, and the second track circumscribes at least in part a region of the second face, which includes at least one second part of the opening of the cavity and/or in which there extends the first track.

8. The pressure sensor according to claim 7, wherein the second track has a part with an inner edge from which the second pads branch off and extend towards the opening of the cavity and the first track has a part with an outer edge from which the first pads branch off and extend towards an outer profile of the sensor body, or towards an inner edge of said part of the second track.

9. The pressure sensor according to claim 1, wherein:
the second track has a part with a substantially annular profile and the first track has a part with a substantially annular profile that extends in a region of the second face that is circumscribed by the part with a substantially annular profile of the second track, and/or
the first track and the second track each have a part that extends according to a circumference or an arc of circumference.

10. The pressure sensor according to claim 9, wherein the substantially annular profile of at least said part of the second track has an interruption through which there extends a further part of the first track, for connection to one of said connection elements.

11. The pressure sensor according to claim 1, wherein the first pads and the second pads extend in an at least approximately radial direction of the second face, and/or the first pad and the second pad of a pair of first and second pads are substantially parallel to each other.

12. The pressure sensor according to claim 1, wherein the first pads and the second pads have a substantially arc-shaped configuration or conformation.

13. The pressure sensor according to claim 1, wherein the first track and the second track are coated by a protection layer.

14. The pressure sensor according to claim 13, wherein the protection layer is open locally, at least one window being at a first pad and a second pad, or at least one first window being at a respective first pad and a second window being at a respective second pad.

15. The pressure sensor according to claim 1, wherein the first track and/or the second track is coated by a protection layer, there resting on the protection layer an annular sealing element that circumscribes a region in which the opening of the cavity is located, the second circuit component being positioned within the region circumscribed by the annular sealing element.

16. The pressure sensor according to claim 15, wherein the protection layer includes a respective substantially annular part in relief, resting on the surface of which is said annular sealing element, said part in relief coating said first track and/or said second track.

17. The pressure sensor according to claim 1, wherein the second circuit component:
   is an SMD-type circuit component, connected between a first pad and a second pad next to each other and located in a position that is spatially comprised between an annular sealing element and the opening of the cavity; or else
   is a circuit component with a first rheophore or terminal welded to a first pad and a second rheophore or terminal welded to a second pad, the rheophores or terminals being arranged in such a way that an active part of the second circuit component faces the cavity or projects thereinto.

18. A pressure detection device, comprising a pressure sensor according to claim 1.

19. A pressure sensor comprising a sensor body made at least in part of electrically insulating material, having a first face and a second face opposite to each other and a cavity, the cavity being closed at at least one axial end thereof by a diaphragm portion, the pressure sensor also comprising a circuit arrangement supported by the sensor body and including:
   a first electrical-circuit pattern, comprising respective tracks of electrically conductive material deposited on the first face, on its side external to the cavity, there being connected to the first electrical-circuit pattern a plurality of first circuit components, amongst which a detection arrangement for detecting bending or deformation of the diaphragm portion,
   a second electrical-circuit pattern, comprising respective tracks of electrically conductive material deposited on a region of the second face;
   connection elements, which electrically connect the first electrical-circuit pattern to the second electrical-circuit pattern and extend at least in an axial direction of the sensor body,
   wherein the tracks of the second electrical-circuit pattern comprise at least one first track and at least one second track for a further circuit part,
   wherein the tracks of the second electrical-circuit pattern comprise a track, respectively a plurality of tracks, that is arranged or that are arranged, respectively, so as to define a substantially annular profile
   and wherein on the second face there is deposited a protection layer that coats said track, or said plurality of tracks, respectively, and on which there rests an annular sealing element that circumscribes a region in which there is positioned the further circuit part, the protection layer including a respective substantially annular part, which defines a substantially flat surface for support of said sealing element.

20. A pressure sensor comprising a sensor body made at least in part of electrically insulating material, having a first face and a second face opposite to each other and a cavity, the cavity being closed at at least one axial end thereof by a diaphragm portion, the pressure sensor also comprising a circuit arrangement supported by the sensor body and including:
   a first electrical-circuit pattern, comprising respective tracks made of electrically conductive material deposited on the first face, on its side external to the cavity, there being connected to the first electrical-circuit pattern a plurality of first circuit components, amongst which a detection arrangement for detecting bending or deformation of the diaphragm portion,
   a second electrical-circuit pattern, comprising respective tracks made of electrically conductive material deposited on a region of the second face, the second electrical-circuit pattern including at least one second circuit component or part having an active part, designed to be exposed to the fluid, and at least one first and one second connection terminals;
   connection elements, which electrically connect the first electrical-circuit pattern to the second electrical-circuit pattern and extend at least in an axial direction of the sensor body,
   wherein the tracks of the second electrical-circuit pattern comprise at least one first track defining a plurality of first pads and one second track defining a plurality of second pads for electrical connection of the first terminal and of the second terminal of the second circuit component or part, respectively,
   and wherein the first and the second tracks are prearranged in such a way that the first terminal and the second terminal of the second circuit component or part are connectable to any of the first pads and to any of the second pads, respectively, and/or to the first pad and to the second pad, respectively, of any of a plurality of pairs of first and second pads.

* * * * *